United States Patent [19]
Ruben

[11] Patent Number: 5,461,512
[45] Date of Patent: Oct. 24, 1995

[54] ZOOM CAMERA LENS HAVING THREE MOVING GROUPS

[75] Inventor: Paul L. Ruben, Penfield, N.Y.

[73] Assignee: Eastman Kodak Company, Rochester, N.Y.

[21] Appl. No.: 159,987

[22] Filed: Nov. 30, 1993

[51] Int. Cl.$^6$ .................................................. G02B 15/14
[52] U.S. Cl. ........................................ 359/689; 359/695
[58] Field of Search .................................... 359/689, 684, 359/695

[56] References Cited

U.S. PATENT DOCUMENTS

| | | | |
|---|---|---|---|
| 4,571,031 | 2/1986 | Kato | 359/689 |
| 4,730,907 | 3/1988 | Kikuchi et al. | 359/689 |
| 4,934,794 | 6/1990 | Ueda | 359/689 |
| 4,938,572 | 7/1990 | Iwasaki | 359/689 |
| 4,955,700 | 9/1990 | Yamaguchi | 359/689 |
| 5,153,776 | 10/1992 | Nozawa | 359/676 |
| 5,175,648 | 12/1992 | Mori | 359/689 |
| 5,218,477 | 6/1993 | Ito | 359/689 |
| 5,274,504 | 12/1993 | Itoh | 359/689 |
| 5,371,631 | 12/1994 | Takada | 359/689 |

FOREIGN PATENT DOCUMENTS

| | | |
|---|---|---|
| 405173074 | 7/1973 | Japan . |
| 0163716 | 6/1989 | Japan . |
| 63-15412 | 8/1989 | Japan . |
| 64-21027 | 8/1990 | Japan . |
| 0201410 | 8/1990 | Japan . |
| 405093866 | 4/1993 | Japan . |
| 405157969 | 6/1993 | Japan . |

Primary Examiner—Georgia Y. Epps
Assistant Examiner—Evelyn A. Lester
Attorney, Agent, or Firm—Leonard W. Treash, Jr.

[57] ABSTRACT

A zoom camera lens which is particularly compact, has a small number of elements and is capable of good performance at relatively wide aperture has a front negative lens group, a middle positive lens group and a rear negative lens group. The rear negative lens group has a focal length not more than 1.25 times the focal length of the middle positive lens group. Preferably, the lens has seven or eight elements and is designed without the use of aspheres.

13 Claims, 2 Drawing Sheets

FIG. 5  TELE

FIG. 6  WIDE

FIG. 7  STORED

ZOOM CAMERA LENS HAVING THREE MOVING GROUPS

This invention relates to zoom camera lenses having at least three moving groups.

U.S Pat. No. 5,153,776, issued Oct. 6, 1992 to Nozawa, is typical of a large number of complex multi-element wide angle zoom camera lenses having a field angle of 70° or more in the wide angle position and a zoom ratio of 3 or more. These prior lenses have a front group of negative power, a middle group of positive power and a rear group of negative power with all three groups moving independently to vary focal length. The middle positive group includes a number of air-spaced elements with a stop placed either immediately in front of or immediately to the rear of the group. Such lenses commonly have 10 to 15 elements, and may include some aspheric surfaces. They are relatively long from the front surface to the film plane. Negative power in the lens is somewhat evenly divided between the front and rear negative groups while the middle positive group is more powerful than either of the negative groups.

U.S. Pat. No. 5,175,648 to Mori, Dec. 29, 1992, shows a similarly constructed lens in which power of the rear negative group is increased to make the lens more compact. This lens also has ten or more elements with some aspheric surfaces.

U.S. Pat. No. 4,955,700, issued Sep. 11, 1990 to Yamaguchi, shows a ten element zoom lens of generally the same type in which the focal length of the rear group is less than the focal length of the front group to provide compactness to the system. The front group contains a negative and positive element which are meniscus to the front. The lens has a four or five element middle positive group and a four element rear negative group.

Japanese Laid-Open Patent Applications 63-15412 and 64-21027, laid open Aug. 1, 1989 and Aug. 9, 1990, respectively, show eight element designs in which the front and rear groups each have two elements with a four element middle group.

SUMMARY OF THE INVENTION

It is an object of the invention to provide a zoom camera lens having at least three moving lens groups and substantial zoom range with a minimum number of lens elements.

This and other objects are accomplished by a zoom camera lens having at least three movable lens groups, arranged, from the object side, a front negative group, a middle positive group and a rear negative group. The front and rear negative groups each have two elements. The focal length of the rear group is not more than 1.25 times the focal length of the middle group. A stop for the lens is positioned adjacent to but slightly in front of the middle group and is movable with the middle positive group.

According to a preferred embodiment, the two elements in the front negative group are a negative element and a positive element which are movable with respect to each other to better control distortion in the lens.

According to another preferred embodiment, the middle positive group consists of two components, a positive singlet and a positive doublet, providing a well corrected compact 3X zoom lens having only seven elements which provide high quality images without the use of aspheres.

According to another preferred embodiment, both elements of both the front and rear groups have indexes of refraction of 1.7 or greater.

In general, these lenses are effective over a 3 to 1 range (3X), a wide angle f/number of 4.6 or less, and are well corrected despite a small number of elements and without a need for aspheric surfaces.

Like some of the prior art cited above, these lenses are longer from the front of the first element to the film plane in the telephoto range than they are in the wide angle position, but the elements are closer together in the telephoto position and more widely separated in the wide angle position. According to a preferred embodiment of the invention, the lenses have a position in which the groups are more compacted even than the telephoto position and are positioned closer to the film plane than the wide angle position. This is not a position for taking pictures but is extremely useful as a stored position allowing the closing of covers and general compactness to the camera when not in use.

DESCRIPTION OF THE PREFERRED EMBODIMENTS

Further advantages will be apparent from the Examples below.

Note that Examples 1, 2, 3 and 5 contain just seven elements and that Examples 1–5 have the stop immediately in front of the middle group. This location of the stop has minimized the diameter of the lens barrel encasement.

The wide angle field coverage, especially of Examples 1–5, is extremely large, for example, a semifield angle of 40.03° in a lens constructed according to Example 1.

In Examples 1–5 the indices of refraction in both the first and last negative groups contain elements which are all in excess of 1.7. In both groupings, the positive element has a lower abbe V number than does the negative element.

Although some aspects of these lenses can be used in lenses having aspheres, a significant advantage of these designs is that they operate well across the range in apertures of which they are designed with a minimum number of elements without aspheres.

In the following Examples distances are in millimeters. The index is for the e line of the spectrum and V is the abbe number.

| | Example I (FIG. 1) | | | | | |
|---|---|---|---|---|---|---|
| SURFACE | CLEAR APERTURE | AXIAL BEAM | RADIUS | THICKNESS | INDEX | V |
| 1 | 26.64 | 5.60 | 23.8205 | 1.300 | 1.713 | 53.8 |
| 2 | 21.16 | 5.46 | 11.9916 | 7.800 | | |
| 3 | 19.44 | 6.73 | 34.9306 | 3.400 | 1.755 | 27.6 |
| 4 | 17.98 | 6.77 | 90.1422 | A | | |

-continued

Figure 1:
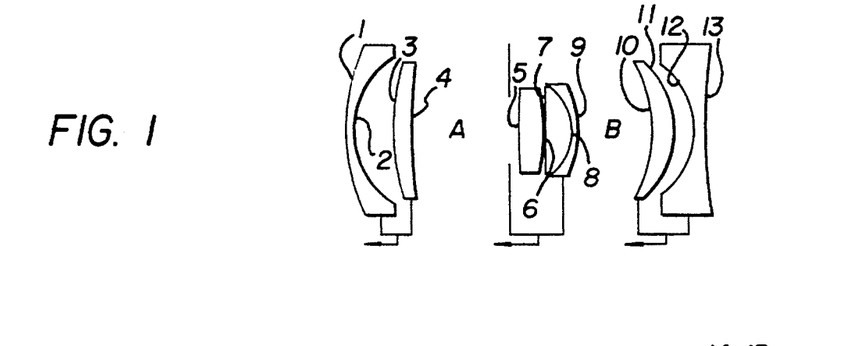
FIGS. 1–4 are cross-section schematics of zoom lenses.

Example I (FIG. 1)

|   | | | | | | |
|---|---|---|---|---|---|---|
|   | 7.71 | 7.71 | DIAPHRAGM | 1.641 | | |
| 5 | 9.49 | 7.85 | 79.3527 | 5.735 | 1.487 | 70.4 |
| 6 | 12.74 | 7.94 | −20.3517 | .250 | | |
| 7 | 13.74 | 7.83 | 253.018 | 5.682 | 1.487 | 70.4 |
| 8 | 14.82 | 7.21 | −10.1265 | 1.000 | 1.755 | 27.6 |
| 9 | 16.33 | 7.23 | −17.6583 | B | | |
| 10 | 21.33 | 3.37 | −23.6888 | 4.666 | 1.755 | 27.6 |
| 11 | 22.81 | 2.87 | −15.5713 | 2.957 | | |
| 12 | 21.81 | 1.87 | 13.8594 | 1.300 | 1.713 | 53.8 |
| 13 | 27.50 | 1.69 | 102.021 | | | |

| FOCAL LENGTH | BACK FOCUS | FRONT FOCUS | ZOOM SPACINGS A | B | LENS LENGTH |
|---|---|---|---|---|---|
| 25.75 | 7.97 | 12.06 | 12.647 | 12.503 | 60.881 |
| 43.31 | 30.20 | 27.56 | 10.403 | 5.318 | 51.452 |
| 72.81 | 66.05 | 53.97 | 7.598 | 1.080 | 44.408 |

Example 1 is a 3X zoom lens which has a semi-field which varies from 40.03° to 16.55° and an f/number which varies from 4.6 to 7.0 as focal length increases. It has an unusually large angular field in this wide angle position for a lens with only seven elements and no aspheric surfaces. The diaphragm location has minimized the diameter of the lens barrel encasement. The front negative group (surfaces 1–4), middle positive group (surfaces 5–9) and rear negative group (surfaces 10–13) have focal lengths of −81.08, 22.19 and −25.44.

Example 2 is a 3X zoom lens which has a semi-field from 38.84° to 15.15° and an f/number from 4.1 to 8.2. The front negative group (surfaces 1–4), middle positive group (surfaces 5–9) and rear negative group (surfaces 10–13) have focal lengths of −70.97, 24.37 and −29.07. It has the same advantages as Example 1.

Example 2

| SURFACE | CLEAR APERTURE | AXIAL BEAM | RADIUS | THICKNESS | INDEX | V |
|---|---|---|---|---|---|---|
| 1 | 29.53 | 10.56 | 26.0035 | 1.500 | 1.713 | 53.8 |
| 2 | 23.31 | 10.22 | 13.0257 | 8.023 | | |
| 3 | 21.65 | 12.78 | 23.8960 | 4.000 | 1.755 | 27.6 |
| 4 | 19.64 | 12.55 | 34.2671 | A | | |
|   | 13.80 | 13.80 | DIAPHRAGM | 3.045 | | |
| 5 | 15.94 | 14.43 | 53.1290 | 4.039 | 1.487 | 70.4 |
| 6 | 16.50 | 14.50 | −24.6319 | .280 | | |
| 7 | 16.62 | 14.12 | 373.842 | 7.000 | 1.487 | 70.4 |
| 8 | 16.99 | 13.20 | −11.3452 | 1.200 | 1.755 | 27.6 |
| 9 | 18.73 | 12.53 | −20.1044 | B | | |
| 10 | 23.43 | 12.35 | −27.4405 | 4.899 | 1.755 | 27.6 |
| 11 | 24.82 | 9.55 | −17.3869 | 3.428 | | |
| 12 | 23.52 | 9.31 | −15.0024 | 1.500 | 1.713 | 53.8 |
| 13 | 29.34 | 2.60 | 132.817 | | | |

| FOCAL LENGTH | BACK FOCUS | FRONT FOCUS | ZOOM SPACINGS A | B | LENS LENGTH |
|---|---|---|---|---|---|
| 30.63 | 10.90 | 15.39 | 14.109 | 13.408 | 66.431 |
| 51.50 | 36.10 | 35.20 | 10.929 | 5.876 | 55.719 |
| 86.60 | 76.37 | 68.58 | 7.596 | 1.402 | 47.911 |

| Example 3 (FIG. 1) | | | | | | |
|---|---|---|---|---|---|---|
| SURFACE | CLEAR APERTURE | AXIAL BEAM | RADIUS | THICKNESS | INDEX | V |
| 1 | 20.25 | 8.31 | 29.2550 | 1.000 | 1.713 | 53.8 |
| 2 | 15.98 | 8.12 | 9.54200 | 3.277 | | |
| 3 | 15.69 | 9.71 | 16.3100 | 3.205 | 1.575 | 41.5 |
| 4 | 15.00 | 9.89 | −2039.98 | A | | |
| | 10.57 | 10.57 | DIAPHRAGM | 2.413 | | |
| 5 | 10.92 | 10.79 | −31.1150 | 2.092 | 1.487 | 70.4 |
| 6 | 11.29 | 11.05 | −13.0600 | .200 | | |
| 7 | 11.78 | 10.73 | 32.7600 | 4.766 | 1.487 | 70.4 |
| 8 | 11.85 | 10.17 | −7.99000 | 1.000 | 1.755 | 27.6 |
| 9 | 12.76 | 10.31 | −13.7050 | B | | |
| 10 | 16.89 | 9.61 | −17.2500 | 2.782 | 1.805 | 25.4 |
| 11 | 17.75 | 9.58 | −12.2500 | 2.182 | | |
| 12 | 17.26 | 7.44 | −11.2600 | 1.000 | 1.713 | 53.8 |
| 13 | 21.78 | 7.21 | 64.0100 | | | |

| FOCAL | | | ZOOM SPACINGS | | |
|---|---|---|---|---|---|
| LENGTH | BACK FOCUS | FRONT FOCUS | A | B | LENS LENGTH |
| 20.60 | 5.69 | 13.17 | 9.417 | 9.978 | 43.312 |
| 34.63 | 22.65 | 25.89 | 7.975 | 4.345 | 36.237 |
| 58.17 | 50.54 | 47.23 | 6.079 | 1.000 | 30.997 |

Example 3 is a 3X zoom lens having a semi-field varying from 39.24° to 16.24° and an f/number varying from 4.6 to 7. It has similar advantages to Examples 1 and 2. The front negative group (surfaces 1–4), middle positive group (surfaces 5–9) and rear negative group (surfaces 10–13) have focal lengths of −118.06, 17.61 and −19.04, respectively.

Figure 2:
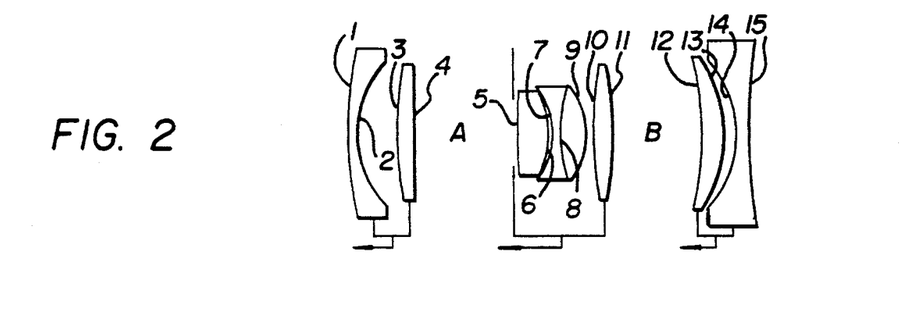

Example 4 is a 3X zoom lens with a semi-field varying from 38.84° to 15.55° and an f/number varying from 4.1 to 8.2. The front negative group (surfaces 1–4), middle positive group (surfaces 5–11) and the rear negative group (surfaces 12–15) have focal lengths of −164.09, 27.29 and −30.21, respectively.

| Example 4 (FIG. 2) | | | | | | |
|---|---|---|---|---|---|---|
| SURFACE | CLEAR APERTURE | AXIAL BEAM | RADIUS | THICKNESS | INDEX | V |
| 1 | 29.50 | 10.55 | 51.5789 | 1.500 | 1.713 | 53.8 |
| 2 | 23.86 | 10.37 | 15.3923 | 8.338 | | |
| 3 | 22.11 | 13.44 | 41.6405 | 4.000 | 1.755 | 27.6 |
| 4 | 20.99 | 13.67 | −321.578 | A | | |
| | 14.32 | 14.32 | DIAPHRAGM | 1.000 | | |
| 5 | 14.69 | 14.43 | 107.407 | 6.454 | 1.583 | 46.5 |
| 6 | 15.39 | 14.47 | −15.3498 | 0.364 | | |
| 7 | 15.30 | 14.28 | −14.2795 | 1.200 | 1.750 | 35.0 |
| 8 | 16.80 | 14.90 | 24.8353 | 6.037 | 1.517 | 64.2 |
| 9 | 17.76 | 15.69 | −16.4388 | 0.833 | | |
| 10 | 21.21 | 15.20 | 45.1331 | 5.019 | 1.487 | 70.4 |
| 11 | 22.05 | 14.42 | −45.1330 | B | | |
| 12 | 25.78 | 13.85 | −33.2522 | 4.796 | 1.755 | 27.6 |
| 13 | 26.97 | 13.51 | −20.4160 | 3.102 | | |
| 14 | 25.82 | 10.90 | −18.1258 | 1.500 | 1.713 | 53.8 |
| 15 | 30.73 | 10.57 | 74.5288 | | | |

| FOCAL | | | ZOOM SPACINGS | | |
|---|---|---|---|---|---|
| LENGTH | BACK FOCUS | FRONT FOCUS | A | B | LENS LENGTH |
| 30.62 | 11.67 | 14.21 | 12.500 | 14.805 | 71.448 |
| 51.48 | 39.93 | 31.25 | 9.901 | 6.375 | 60.419 |
| 86.53 | 86.70 | 59.32 | 7.120 | 1.328 | 52.591 |

Figure 3:
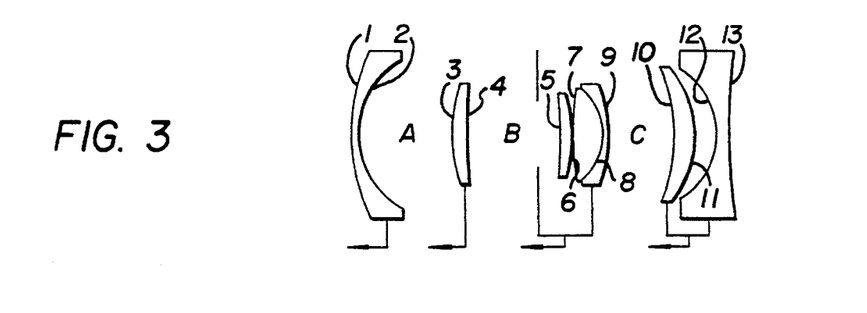

Example 5 (FIG. 3)

| SURFACE | CLEAR APERTURE | AXIAL BEAM | RADIUS | THICKNESS | INDEX | V |
|---|---|---|---|---|---|---|
| 1 | 29.24 | 10.39 | 28.2283 | 1.300 | 1.713 | 53.8 |
| 2 | 23.55 | 10.12 | 13.7289 | A | | |
| 3 | 17.45 | 12.77 | 22.5046 | 2.884 | 1.575 | 41.5 |
| 4 | 16.48 | 12.72 | 127.293 | B | | |
|  | 12.83 | 12.83 | DIAPHRAGM | 4.548 | | |
| 5 | 13.72 | 12.89 | −39.3727 | 2.342 | 1.487 | 70.4 |
| 6 | 14.25 | 13.10 | −20.0532 | .200 | | |
| 7 | 14.85 | 12.80 | 37.8954 | 5.721 | 1.487 | 70.4 |
| 8 | 15.21 | 12.07 | −10.5998 | 1.000 | 1.755 | 27.6 |
| 9 | 16.78 | 12.14 | −20.0815 | C | | |
| 10 | 21.73 | 11.56 | −22.7888 | 4.513 | 1.805 | 25.4 |
| 11 | 23.40 | 11.57 | −16.1794 | 4.079 | | |
| 12 | 22.55 | 8.39 | −14.4274 | 1.300 | 1.713 | 53.8 |
| 13 | 28.65 | 8.17 | 115.109 | | | |

| FOCAL LENGTH | BACK FOCUS | FRONT FOCUS | ZOOM SPACINGS A | B | C | LENS LENGTH |
|---|---|---|---|---|---|---|
| 25.75 | 7.04 | 11.32 | 14.774 | 9.393 | 11.347 | 63.400 |
| 43.27 | 25.22 | 30.83 | 10.511 | 9.550 | 5.519 | 53.467 |
| 72.76 | 57.12 | 61.04 | 8.606 | 7.473 | 1.099 | 45.064 |

Figure 4:
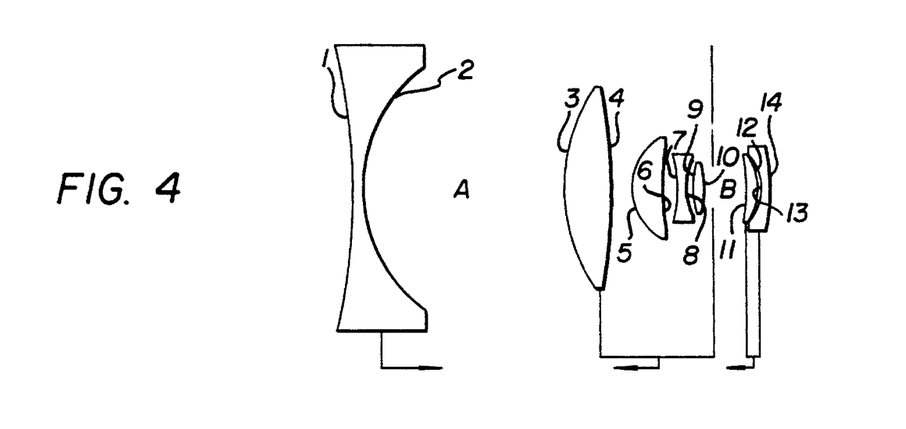
Figure 5:
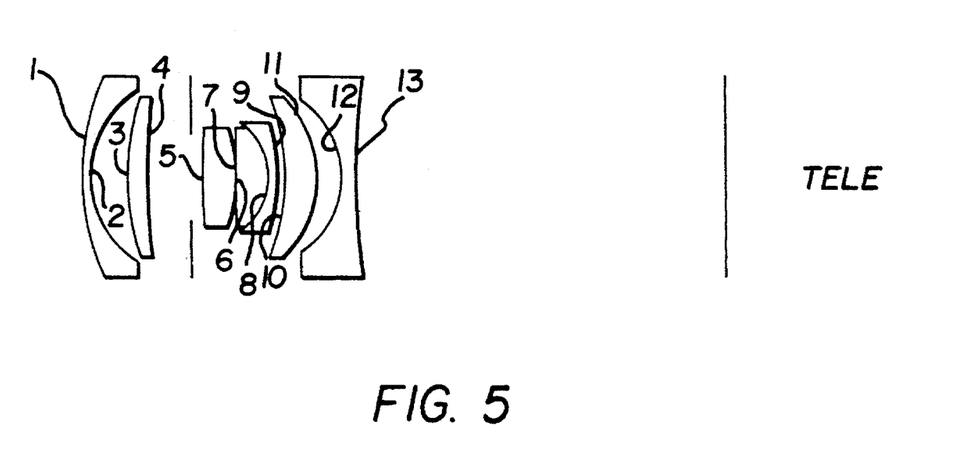
FIGS. 5–7 are cross-section schematics illustrating an arrangement of lens groups of the FIG. 1 lens in its wide angle, telephoto, and stored conditions.
Figure 6:
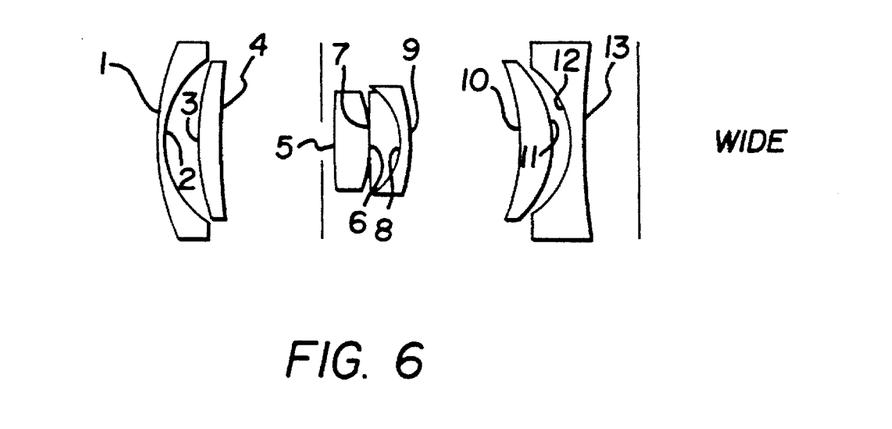
Figure 7:
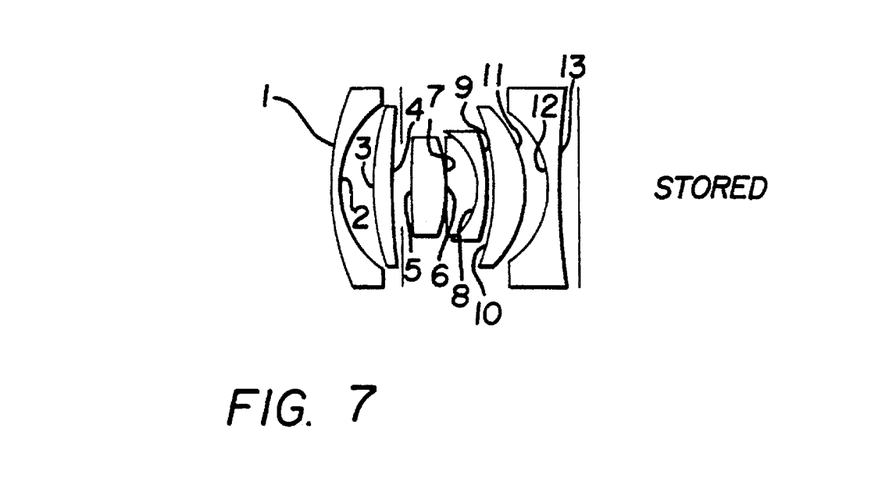

Example 5 is a 3X zoom lens constructed similarly to Examples 1–4 except that there are four moving groups rather than three. The first two elements which are moved as a group in Examples 1–4, are now moved differentially. This differential movement improves control of distortion. Focal lengths of first (surfaces 1 and 2), second (surfaces 3 and 4), third (surfaces 5–9) and fourth (surfaces 10–13) groups are −38.77, 46.80, 27.21 and −26.59. Example 5 has a semi-field which varies from 39.77° to 16.45° and an f/number which varies from 4.6 to 7.0 as overall focal length increases.

varies from 38.61° to 15.22° and an f/number which varies from 4.10 to 8.67 as focal length increases. The front (surfaces 1–2), middle (surfaces 3–10) and rear (surfaces 11–14) groups have focal lengths of −79.01, 38.07 and −109.0, respectively. This lens does not have the relatively equal focal length relationship of the middle and rear groups of Examples 1–5 and, therefore, does not have the remarkable compactness of those lenses. By arranging the four elements of the second (middle) group and the two elements of the third (rear) group in configuration of separated air-spaced elements with a stop in close proximity to the fourth element of the middle group, spherical aberration, corona and chromatic aberrations are easily controlled.

Example 6 (FIG. 4)

| SURFACE | CLEAR APERTURE | AXIAL BEAM | RADIUS | THICKNESS | INDEX | V |
|---|---|---|---|---|---|---|
| 1 | 83.55 | 7.47 | −460.060 | 3.000 | 1.517 | 64.2 |
| 2 | 67.42 | 7.49 | 45.0930 | A | | |
| 3 | 56.61 | 13.22 | 50.8870 | 14.420 | 1.713 | 53.8 |
| 4 | 53.99 | 12.47 | −206.036 | 4.477 | | |
| 5 | 30.90 | 11.73 | 19.6276 | 8.159 | 1.517 | 64.2 |
| 6 | 26.58 | 9.48 | 55.9770 | 4.294 | | |
| 7 | 19.74 | 8.03 | −48.5177 | 2.400 | 1.755 | 27.6 |
| 8 | 15.77 | 7.64 | 20.3558 | 1.923 | | |
| 9 | 14.79 | 7.74 | 29.1091 | 3.596 | 1.620 | 60.3 |
| 10 | 13.57 | 7.52 | −29.1091 | 2.551 | | |
|  | 6.74 | 6.74 | DIAPHRAGM | B | | |
| 11 | 19.08 | 3.91 | −48.0070 | 3.982 | 1.755 | 27.6 |
| 12 | 20.80 | 3.42 | −19.1574 | 1.605 | | |
| 13 | 21.18 | 2.84 | −15.7039 | 3.000 | 1.713 | 53.8 |
| 14 | 27.42 | 2.45 | −67.5502 | | | |

| FOCAL LENGTH | BACK FOCUS | FRONT FOCUS | ZOOM SPACINGS A | B | LENS LENGTH |
|---|---|---|---|---|---|
| 30.63 | 10.16 | −16.58 | 60.013 | 10.170 | 123.590 |
| 51.49 | 30.24 | 19.52 | 26.042 | 3.982 | 81.782 |
| 86.59 | 50.20 | 85.88 | 1.439 | 1.110 | 55.956 |

Example 6 is a 3X zoom lens having a semi-field which

I claim:

1. A zoom camera lens having three independently movable groups, from the object side, a front group of negative power, a middle group of positive power and a rear group of negative power in which the front and rear negative groups each have two elements, the rear negative group has a focal length not more than 1.25 times the focal length of the middle positive group and an aperture stop that is positioned adjacent to and in front of the middle positive group and is movable with the middle positive group.

2. The zoom camera lens according to claim 1 wherein the indices of refraction for the e line of the spectrum of both elements of the front and rear negative groups is 1.7 or above.

3. A zoom camera lens according to claim 1 wherein the front negative group includes, from the object side, a front negative element and a rear positive element which move relative to each other during zooming.

4. A zoom camera lens according to claim 1 which has a telephoto, wide angle and stored positions, in which in the telephoto position the front negative group is further from the film plane than when in the other two positions and in which in the wide angle position the groups are more spread apart than in the other two positions and in which in the stored position the groups are closer together and closer to the film plane than in the other two positions.

5. A zoom camera lens according to claim 1 wherein the middle positive group consists only of two components, a positive singlet and a positive doublet.

6. A zoom camera lens according to claim 1 having not more than eight elements and no aspheric surfaces, but being usable at an f/number of 4.6 or less in the wide angle position.

7. A zoom camera lens according to claim 2 wherein both the front and rear groups have a positive and a negative element and the positive element has a lower abbe V number than does the negative element.

8. A zoom camera lens constructed according to claim 1 and to the following chart in which the surfaces are numbered from the object to the image side, all distances are in millimeters and the index of refraction and abbe V numbers are for the e line of the spectrum:

| SURFACE | CLEAR APERTURE | AXIAL BEAM | RADIUS | THICKNESS | INDEX | V |
|---|---|---|---|---|---|---|
| 1 | 26.64 | 5.60 | 23.8205 | 1.300 | 1.713 | 53.8 |
| 2 | 21.16 | 5.46 | 11.9916 | 7.800 | | |
| 3 | 19.44 | 6.73 | 34.9306 | 3.400 | 1.755 | 27.6 |
| 4 | 17.98 | 6.77 | 90.1422 | A | | |
| | 7.71 | 7.71 | DIAPHRAGM | 1.641 | | |
| 5 | 9.49 | 7.85 | 79.3527 | 5.735 | 1.487 | 70.4 |
| 6 | 12.74 | 7.94 | −20.3517 | .250 | | |
| 7 | 13.74 | 7.83 | 253.018 | 5.682 | 1.487 | 70.4 |
| 8 | 14.82 | 7.21 | −10.1265 | 1.000 | 1.755 | 27.6 |
| 9 | 16.33 | 7.23 | −17.6583 | B | | |
| 10 | 21.33 | 3.37 | −23.6888 | 4.666 | 1.755 | 27.6 |
| 11 | 22.81 | 2.87 | −15.5713 | 2.957 | | |
| 12 | 21.81 | 1.87 | −13.8594 | 1.300 | 1.713 | 53.8 |
| 13 | 27.50 | 1.69 | 102.021 | | | |

| FOCAL LENGTH | BACK FOCUS | FRONT FOCUS | ZOOM SPACINGS A | B | LENS LENGTH |
|---|---|---|---|---|---|
| 25.75 | 7.97 | 12.06 | 12.647 | 12.503 | 60.881 |
| 43.31 | 30.20 | 27.56 | 10.403 | 5.318 | 51.452 |
| 72.81 | 66.05 | 53.97 | 7.598 | 1.080 | 44.408 |

9. A zoom camera lens constructed according to claim 1 and to the following chart in which the surfaces are numbered from the object to the image side, all distances are in millimeters and the index of refraction and abbe V numbers are for the e line of the spectrum:

| SURFACE | CLEAR APERTURE | AXIAL BEAM | RADIUS | THICKNESS | INDEX | V |
|---|---|---|---|---|---|---|
| 1 | 29.53 | 10.56 | 26.0035 | 1.500 | 1.713 | 53.8 |
| 2 | 23.31 | 10.22 | 13.0257 | 8.023 | | |
| 3 | 21.65 | 12.78 | 23.8960 | 4.000 | 1.755 | 27.6 |
| 4 | 19.64 | 12.55 | 34.2671 | A | | |
| | 13.80 | 13.80 | DIAPHRAGM | 3.045 | | |
| 5 | 15.94 | 14.43 | 53.1290 | 4.039 | 1.487 | 70.4 |
| 6 | 16.50 | 14.50 | −24.6319 | .280 | | |

-continued

| | | | | | | |
|---|---|---|---|---|---|---|
| 7 | 16.62 | 14.12 | 373.842 | 7.000 | 1.487 | 70.4 |
| 8 | 16.99 | 13.20 | −11.3452 | 1.200 | 1.755 | 27.6 |
| 9 | 18.73 | 12.53 | −20.1044 | B | | |
| 10 | 23.43 | 12.35 | −27.4405 | 4.899 | 1.755 | 27.6 |
| 11 | 24.82 | 9.55 | −17.3869 | 3.428 | | |
| 12 | 23.52 | 9.31 | −15.0024 | 1.500 | 1.713 | 53.8 |
| 13 | 29.34 | 2.60 | 132.817 | | | |

| FOCAL LENGTH | BACK FOCUS | FRONT FOCUS | ZOOM SPACINGS A | ZOOM SPACINGS B | LENS LENGTH |
|---|---|---|---|---|---|
| 30.63 | 10.90 | 15.39 | 14.109 | 13.408 | 66.431 |
| 51.50 | 36.10 | 35.20 | 10.929 | 5.876 | 55.719 |
| 86.60 | 76.37 | 68.58 | 7.596 | 1.402 | 47.911 |

10. A zoom camera lens constructed according to claim 1 and to the following chart in which the surfaces are numbered from the object to the image side, all distances are in millimeters and the index of refraction and abbe V numbers are for the e line of the spectrum:

| SURFACE | CLEAR APERTURE | AXIAL BEAM | RADIUS | THICKNESS | INDEX | V |
|---|---|---|---|---|---|---|
| 1 | 20.25 | 8.31 | 29.2550 | 1.000 | 1.713 | 53.8 |
| 2 | 15.98 | 8.12 | 9.54200 | 3.277 | | |
| 3 | 15.69 | 9.71 | 16.3100 | 3.205 | 1.575 | 41.5 |
| 4 | 15.00 | 9.89 | −2039.98 | A | | |
| | 10.57 | 10.57 | DIAPHRAGM | 2.413 | | |
| 5 | 10.92 | 10.79 | −31.1150 | 2.092 | 1.487 | 70.4 |
| 6 | 11.29 | 11.05 | −13.0600 | .200 | | |
| 7 | 11.78 | 10.73 | 32.7600 | 4.766 | 1.487 | 70.4 |
| 8 | 11.85 | 10.17 | −7.99000 | 1.000 | 1.755 | 27.6 |
| 9 | 12.76 | 10.31 | −13.7050 | B | | |
| 10 | 16.89 | 9.61 | −17.2500 | 2.782 | 1.805 | 25.4 |
| 11 | 17.75 | 9.58 | −12.2500 | 2.182 | | |
| 12 | 17.26 | 7.44 | −11.2600 | 1.000 | 1.713 | 53.8 |
| 13 | 21.78 | 7.21 | 64.0100 | | | |

| FOCAL LENGTH | BACK FOCUS | FRONT FOCUS | ZOOM SPACINGS A | ZOOM SPACINGS B | LENS LENGTH |
|---|---|---|---|---|---|
| 20.60 | 5.69 | 13.17 | 9.417 | 9.978 | 43.312 |
| 34.63 | 22.65 | 25.89 | 7.975 | 4.345 | 36.237 |
| 58.17 | 50.54 | 47.23 | 6.079 | 1.000 | 30.997 |

11. A zoom camera lens constructed according to claim 1 and to the following chart in which the surfaces are numbered from the object to the image side, all distances are in millimeters and the index of refraction and abbe V numbers are for the e line of the spectrum:

| SURFACE | CLEAR APERTURE | AXIAL BEAM | RADIUS | THICKNESS | INDEX | V |
|---|---|---|---|---|---|---|
| 1 | 29.50 | 10.55 | 51.5789 | 1.500 | 1.713 | 53.8 |
| 2 | 23.86 | 10.37 | 15.3923 | 8.338 | | |
| 3 | 22.11 | 13.44 | 41.6405 | 4.000 | 1.755 | 27.6 |
| 4 | 20.99 | 13.67 | −321.578 | A | | |
| | 14.32 | 14.32 | DIAPHRAGM | 1.000 | | |
| 5 | 14.69 | 14.43 | 107.407 | 6.454 | 1.583 | 46.5 |
| 6 | 15.39 | 14.47 | −15.3498 | 0.364 | | |
| 7 | 15.30 | 14.28 | −14.2795 | 1.200 | 1.750 | 35.0 |
| 8 | 16.80 | 14.90 | 24.8353 | 6.037 | 1.517 | 64.2 |
| 9 | 17.76 | 15.69 | −16.4388 | 0.833 | | |
| 10 | 21.21 | 15.20 | 45.1331 | 5.019 | 1.487 | 70.4 |
| 11 | 22.05 | 14.42 | −45.1330 | B | | |
| 12 | 25.78 | 13.85 | −33.2522 | 4.796 | 1.755 | 27.6 |
| 13 | 26.97 | 13.51 | −20.4160 | 3.102 | | |
| 14 | 25.82 | 10.90 | −18.1258 | 1.500 | 1.713 | 53.8 |
| 15 | 30.73 | 10.57 | 74.5288 | | | |

-continued

| FOCAL LENGTH | BACK FOCUS | FRONT FOCUS | ZOOM SPACINGS A | B | LENS LENGTH |
|---|---|---|---|---|---|
| 30.62 | 11.67 | 14.21 | 12.500 | 14.805 | 71.448 |
| 51.48 | 39.93 | 31.25 | 9.901 | 6.375 | 60.419 |
| 86.53 | 86.70 | 59.32 | 7.120 | 1.328 | 52.591 |

12. A zoom camera lens constructed according to claim 3 and to the following chart in which the surfaces are numbered from the object to the image side, all distances are in millimeters and the index of refraction and abbe V numbers are for the e line of the spectrum:

following chart in which the surfaces are numbered from the object the image side, all distances are in millimeters and the index of refraction and abbe V numbers are for the e line of the spectrum:

| SURFACE | CLEAR APERTURE | AXIAL BEAM | RADIUS | THICKNESS | INDEX | V |
|---|---|---|---|---|---|---|
| 1 | 29.24 | 10.39 | 28.2283 | 1.300 | 1.713 | 53.8 |
| 2 | 23.55 | 10.12 | 13.7289 | A | | |
| 3 | 17.45 | 12.77 | 22.5046 | 2.884 | 1.575 | 41.5 |
| 4 | 16.48 | 12.72 | 127.293 | B | | |
| | 12.83 | 12.83 | DIAPHRAGM | 4.548 | | |
| 5 | 13.72 | 12.89 | −39.3727 | 2.342 | 1.487 | 70.4 |
| 6 | 14.25 | 13.10 | −20.0532 | .200 | | |
| 7 | 14.85 | 12.80 | 37.8954 | 5.721 | 1.487 | 70.4 |
| 8 | 15.21 | 12.07 | −10.5998 | 1.000 | 1.755 | 27.6 |
| 9 | 16.78 | 12.14 | −20.0815 | C | | |
| 10 | 21.73 | 11.56 | −22.7888 | 4.513 | 1.805 | 25.4 |
| 11 | 23.40 | 11.57 | −16.1794 | 4.079 | | |
| 12 | 22.55 | 8.39 | −14.4274 | 1.300 | 1.713 | 53.8 |
| 13 | 28.65 | 8.17 | 115.109 | | | |

| FOCAL LENGTH | BACK FOCUS | FRONT FOCUS | ZOOM SPACINGS A | B | C | LENS LENGTH |
|---|---|---|---|---|---|---|
| 25.75 | 7.04 | 11.32 | 14.774 | 9.393 | 11.347 | 63.400 |
| 43.27 | 25.22 | 30.83 | 10.511 | 9.550 | 5.519 | 53.467 |
| 72.76 | 57.12 | 61.04 | 8.606 | 7.473 | 1.099 | 45.064 |

13. A zoom camera lens constructed according to the

| SURFACE | CLEAR APERTURE | AXIAL BEAM | RADIUS | THICKNESS | INDEX | V |
|---|---|---|---|---|---|---|
| 1 | 83.55 | 7.47 | −460.060 | 3.000 | 1.517 | 64.2 |
| 2 | 67.42 | 7.49 | 45.0930 | A | | |
| 3 | 56.61 | 13.22 | 50.8870 | 14.420 | 1.713 | 53.8 |
| 4 | 53.99 | 12.47 | −206.036 | 4.477 | | |
| 5 | 30.90 | 11.73 | 19.6276 | 8.159 | 1.517 | 64.2 |
| 6 | 26.58 | 9.48 | 55.9770 | 4.294 | | |
| 7 | 19.74 | 8.03 | −48.5177 | 2.400 | 1.755 | 27.6 |
| 8 | 15.77 | 7.64 | 20.3558 | 1.923 | | |
| 9 | 14.79 | 7.74 | 29.1091 | 3.596 | 1.620 | 60.3 |
| 10 | 13.57 | 7.52 | −29.1091 | 2.551 | | |
| | 6.74 | 6.74 | DIAPHRAGM | B | | |
| 11 | 19.08 | 3.91 | −48.0070 | 3.982 | 1.755 | 27.6 |
| 12 | 20.80 | 3.42 | −19.1574 | 1.605 | | |
| 13 | 21.18 | 2.84 | −15.7039 | 3.000 | 1.713 | 53.8 |
| 14 | 27.42 | 2.45 | −67.5502 | | | |

| FOCAL LENGTH | BACK FOCUS | FRONT FOCUS | ZOOM SPACINGS | | LENS LENGTH |
|---|---|---|---|---|---|
| | | | A | B | |
| 30.63 | 10.16 | −16.58 | 60.013 | 10.170 | 123.590 |
| 51.49 | 30.24 | 19.52 | 26.042 | 3.982 | 81.782 |
| 50.20 | 85.88 | 1.439 | 1.110 | 55.956 | |

* * * * *